April 21, 1959     O. R. GRASS     2,883,211
CONNECTOR FOR FLEXIBLY CONNECTING TUBING
Filed May 31, 1955     2 Sheets-Sheet 1
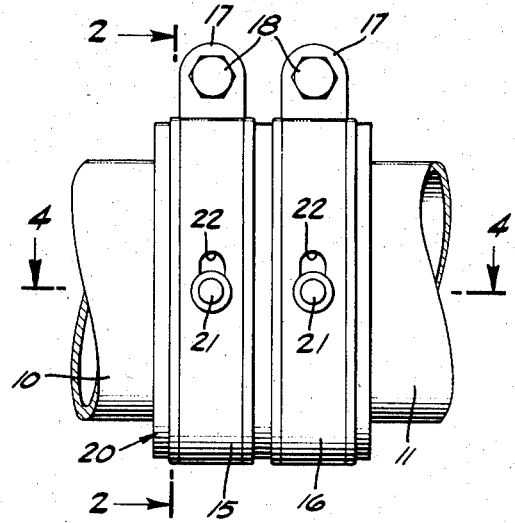
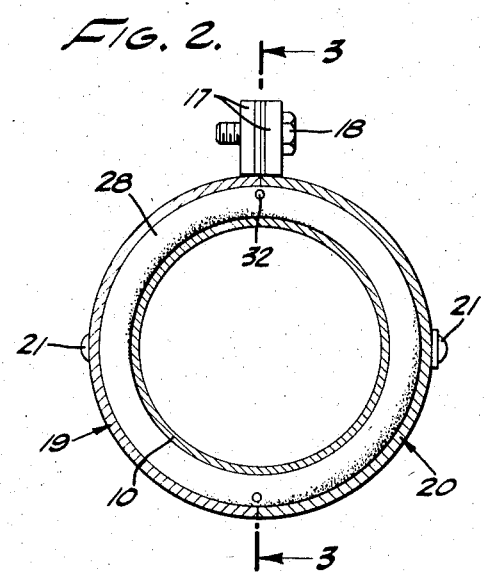
OTTO R. GRASS
INVENTOR.
BY Hazard & Miller
ATTORNEYS April 21, 1959 O. R. GRASS 2,883,211
CONNECTOR FOR FLEXIBLY CONNECTING TUBING
Filed May 31, 1955 2 Sheets-Sheet 2

OTTO R. GRASS
INVENTOR.

BY *Hazard & Miller*

ATTORNEYS

United States Patent Office 2,883,211
Patented Apr. 21, 1959

2,883,211

CONNECTOR FOR FLEXIBLY CONNECTING TUBING

Otto R. Grass, Gardena, Calif., assignor to Rubber Teck, Inc., Gardena, Calif., a corporation of California Application May 31, 1955, Serial No. 512,125

3 Claims. (Cl. 285—233)

This invention relates to a connector for flexibly connecting the adjacent ends of tubing.

Explanatory of the present invention, new designs of aircraft employ relatively large sections of tubing for conducting fuel and for venting purposes. The ends of these sections of tubing are conventionally flared, that is they are internally expanded adjacent their ends so as to provide external beads thereon. These sections of tubing frequently are located in the wings of the aircraft and the connectors employed between adjacent ends of adjacent sections must be such as to permit some degree of flexing of one section of tubing relatively to another to accommodate wing deflection and incidental axial movement. The use of ordinary hose and hose clamp connections for this purpose has been prohibited by regulatory authorities.

An object of the present invention is to provide an improved connector for this purpose which will permit of a limited amount of flexing of one tubing section relatively to another but which will remain leakproof at all times.

Still another object of the invention is to provide a connector for this purpose which can be applied to the adjacent ends of adjacent sections of tubing without requiring that the positions of the tubing be disturbed, either during the course of application of the tubing or in the course of its removal therefrom for replacement purposes.

Another object of the invention is to provide a connector for tubing which may be easily and quickly assembled with the tubing involving no torquing or retorquing requirements and which can be easily maintained.

With the foregoing and other objects in view, which will be made manifest in the following detailed description and specifically pointed out in the appended claims, reference is had to the accompanying drawings for an illustrative embodiment of the invention, wherein:

Figure 1 is a view in side elevation of two adjacent ends of adjacent tubing sections illustrating the connector embodying the present invention in applied position thereon;

Fig. 2 is a sectional view taken substantially upon the line 2—2 upon Fig. 1 in the direction indicated;

Fig. 3 is a vertical section taken substantially upon the line 3—3 upon Fig. 2 in the direction indicated;

Figure 4:
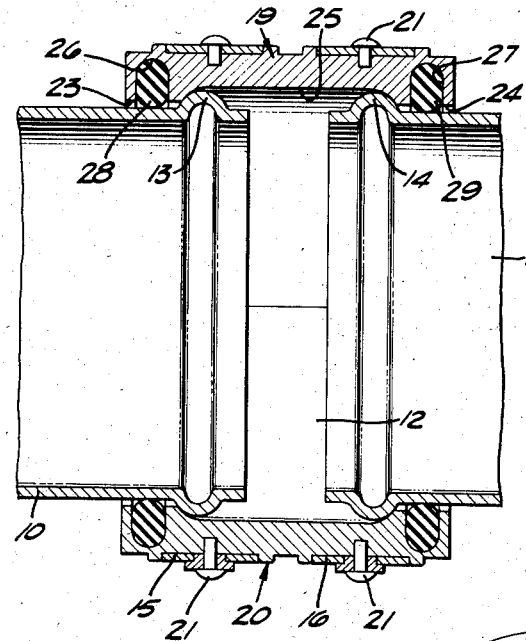
Fig. 4 is a horizontal section taken substantially upon the line 4—4 upon Fig. 1 in the direction indicated.
Figure 5:
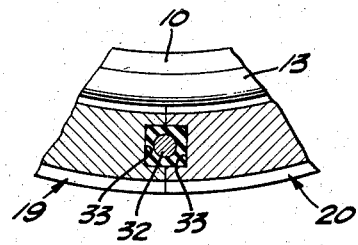
Fig. 5 is a partial view in vertical section taken substantially upon the line 5—5 upon Fig. 3.

Referring to the accompanying drawings wherein similar reference characters designate similar parts throughout, 10 and 11 indicate, respectively, the adjacent ends of two adjacent sections of tubing which may be used to conduct fuel or may be used for venting purposes or any similar purpose. The ends of these adjacent sections are slightly spaced from each other as indicated at 12 and near the ends the sections of tubing are internally flared so as to provide external beads 13 and 14, respectively.

The connector embodying the present invention is designed to connect the two sections 10 and 11 in a leakproof manner but at the same time enable the position of the section 11 to vary angularly with respect to the section 10 as may be occasioned by deflection of an airplane wing in which the tubing sections are installed.

The connector consists of two external steel bands 15 and 16 which are equipped with ears 17 through which bolts 18 or other tightening devices may be inserted for the purpose of tightening the bands in encircling relationship about a split clamping ring. The clamping ring consists of two semi-circular halves 19 and 20 preferably formed of aluminum or magnesium alloy for purposes of lightness in weight. These halves are secured such as by rivets 21 against the inner faces of the bands 15 and 16. Preferably, the rivets or equivalent fastening devices that are used to connect the bands to one of the halves extend through slots 22 formed in the bands so that there is a limited sliding movement permissible between the bands and one of the halves in the course of tightening the bands about the halves of the clamping ring. The halves 19 and 20 of the clamping ring have an internal diameter slightly greater than the exterior of the tubing sections 10 and 11 outwardly of the beads 13 and 14 as indicated by the clearance spaces 23 and 24 so that either section 10 or 11 may flex slightly within the connector relatively to the other. The two halves 19 and 20 of the clamping ring are internally enlarged adjacent the center thereof as indicated at 25 so as to accommodate the beads 13 and 14. The outer sides of the beads 13 and 14 may engage the metallic surfaces at the sides of the enlargement 25 as illustrated in Figs. 3 and 4. The inner or opposed sides of the enlargements 13 and 14 are unobstructed so that whenever occasion requires tubing sections 10 and 11 to flex relatively to each other any portion of either bead 13 or 14 can move inwardly away from the side wall of the enlargement 25. Outwardly of this internal enlargement the two halves are circumferentially grooved with grooves 26 and 27. These grooves are designed to receive and retain endless rubber rings 28 and 29 which are formed of a flexible and highly resilient vulcanized rubber composition. The rings 28 and 29 are initially oval shaped in cross section and are of such size that when the halves of the clamping ring are clamped by the bands 15 and 16 about the tubing ends, the rings 28 and 29 will be compressed into a firm sealing engagement with the outside of the tubing sections 10 and 11. The two rings 28 and 29 are connected to each other by struts 30 and 31 which are also formed of rubber, and these struts are preferably stiffened or reenforced by steel wire cores 32 which are embedded centrally thereof. These struts are receivable in recesses 33 and 34, respectively, formed in end edges of the two semi-circular halves 19 and 20 except for the areas of the recesses 33 and 34 formed in the end faces of the semi-circular halves or sections 19 and 20. The end faces of the sections 19 and 20 are in mutual metal to metal contact when the bolts 18 are tightened. This metal to metal contact limits the contraction or closing of the halves 19 and 20 about the tubing ends 10 and 11. Consequently, the rubber rings 28 and 29 will never be over compressed or caused to extrude through the clearance spaces 23 and 24. Furthermore, over compression or extrusion of the struts 30 and 31 between the end faces will not take place and in the course of usage it is unnecessary to retorque or to tighten up the bolts 18 to compensate for any cold flow of rubber or gasket material.

Figure 6:
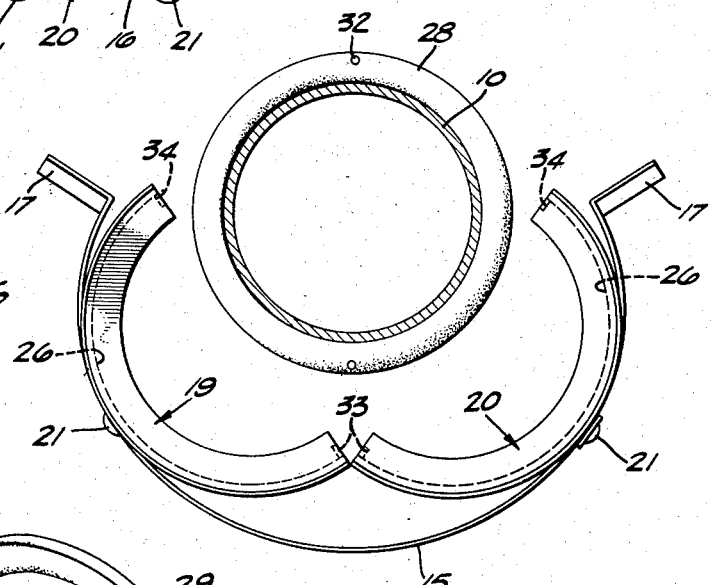
Fig. 6 is a view taken substantially upon the line 2—2 upon Fig. 1, but illustrating the manner in which the connector is applied to the tubing.
Figure 7:
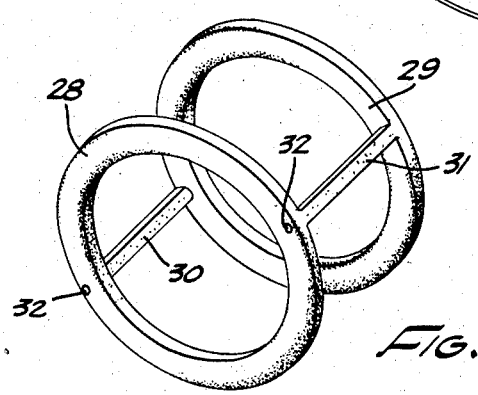
Fig. 7 is a perspective view of the sealing ring forming a part of the connector.

It is desirable to have the connector applicable to the tubing ends without disturbing the positions of the tubing sections. In so doing, the flexibility and resiliency of the rings 28 and 29 is utilized to deform the ring as shown in Fig. 7 into a flat condition that can be inserted in the space 12 between the tubing ends. This is accomplished by merely bending the stiff struts 30 and 31 at their junctures with their respective rings so that the two rings 28 and 29 can assume positions in nearly side-by-side relationship. While in this position the two rings can be inserted through the space 12. One ring may then be slipped onto the section 11 and in so doing, it may be stretched in passing over the bead 14. When this ring has been applied and has been slipped for a considerable distance along the length of the tubing the other ring may assume a position in the space 12 and then be slipped onto the tubing section and stretched over the bead 13. The clamping ring sections 19 and 20 can then be opened up into a position as depicted in Fig. 6 and applied around the rings 28 and 29 and around the ends of the tubing. In applying the halves of the clamping ring the sealing rings 28 and 29 are positioned in their respective grooves 26 and 27. One of the struts 30 is positioned in one of the recesses 33 and the other strut 31 is positioned in a recess 34. Even though these struts are relatively small in cross-sectional size, due to the stiffener or reenforcement 32, they will not sag or drop from their respective recesses in the course of closing the halves 19 and 20 in encircling relationship about the rings 28 and 29 and about the tubing sections. When the halves of the sealing ring have been closed the bolts 18 or their equivalent may be applied to the ears 17 on the bands and the bands may be tightened to draw the ends of the sealing ring halves into firm mutual engagement. When this is completed the rings 28 and 29 will be adequately compressed to form an effective seal circumferentially around each of the tubing sections, which seal will be maintained even though one tubing section may flex with respect to the other. Leakage between the ends of the halves of the clamping ring is effectively prevented by the struts 30 and 31.

It will be appreciated from the above-described construction that the improved connector can be easily and quickly applied to the ends 10 and 11 of adjacent tubing sections without disturbing the positions of the tubing sections. Furthermore, when the connector is in applied position leakage in an axial direction is effectively prevented by the rings 28 and 29. Leakage in a radial direction between the edges of the halves of the clamping ring is effectively prevented by the struts 30 and 31.

If the tubing sections function as a conduit for hydrocarbon fuels and the like which detrimentally affect rubber and rubber-like compositions, it will be appreciated by those skilled in the art that only a very small portion of the sealing rings 28 and 29 is actually exposed for contact by the fuel. Consequently, even in the course of time there is little likelihood of leakage occurring.

Various changes may be made in the details of construction without departing from the spirit and scope of the invention as defined by the appended claims.

I claim:

1. A connector for flexibly connecting tubing sections the adjacent ends of which have external beads which are rounded in cross section comprising rigid arcuate members adapted to collectively encircle said ends, means for holding said members in encircling relation about said ends, said members being internally grooved inwardly of their sides to accommodate the beads on the tubing ends and presenting rigid surfaces engageable with the outer rounded surfaces of said beads, said members being internally grooved adjacent their sides with circumferentially extending grooves, rubber rings adapted to encircle the tubing ends disposed in said grooves and projecting inwardly slightly therefrom so as to engage the tubing ends, opposed recesses in the adjacent mating ends of said arcuate members connecting the grooves in the members adjacent the sides thereof, and struts integral with and connecting the rubber rings disposed in the recesses in sealing engagement with the walls thereof, said members being in direct contact with each other at their mating ends on opposite sides of the areas occupied by the struts.

2. A connector for flexibly connecting tubing sections as defined in claim 1, wherein the struts are reinforced with reinforcing material embedded therein.

3. A connector for flexibly connecting tubing as defined in claim 1, wherein the means for holding the arcuate members in encircling relationship about the tubing ends comprises a flexible metallic band fastened to the back of one of the arcuate members and slidably fastened to the back of another arcuate member, and means for fastening the ends of the flexible metallic band together.

References Cited in the file of this patent

UNITED STATES PATENTS

| 207,871 | Horton | Sept. 10, 1878 |
| 549,594 | Cooper | Nov. 12, 1895 |
| 1,093,868 | Leighty | Apr. 21, 1914 |
| 1,369,913 | Brunhoff | Mar. 1, 1921 |
| 1,427,811 | Heeter | Sept. 5, 1922 |
| 1,903,029 | Damsel | Mar. 28, 1933 |
| 2,094,258 | Thompson | Sept. 28, 1937 |
| 2,342,422 | Morehead | Feb. 22, 1944 |
| 2,402,868 | Boyle | June 25, 1946 |
| 2,426,423 | Woolsey | Aug. 26, 1947 |
| 2,497,441 | Detweiler | Feb. 14, 1950 |
| 2,571,348 | Drinkwater | Oct. 16, 1951 |
| 2,739,828 | Schindler | Mar. 27, 1956 |
| 2,752,173 | Krooss | June 26, 1956 |
| 2,760,792 | Fons | Aug. 28, 1956 |
| 2,777,715 | Beyer | Jan. 15, 1957 |

FOREIGN PATENTS

| 134,426 | Great Britain | Nov. 6, 1919 |
| 527,653 | Great Britain | Oct. 14, 1940 |
| 413,090 | Italy | Mar. 27, 1946 |